United States Patent Office 2,910,411
Patented Oct. 27, 1959

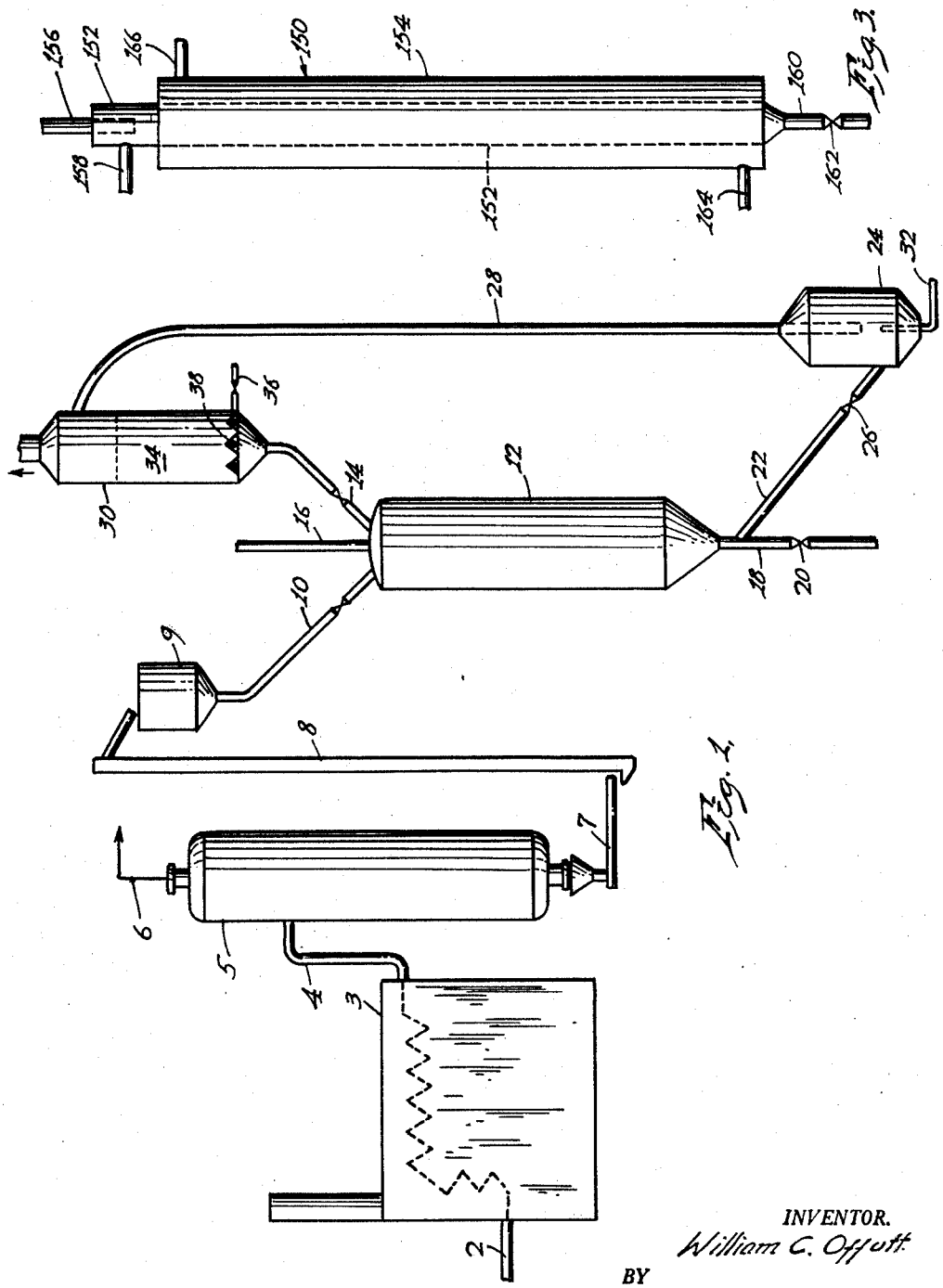

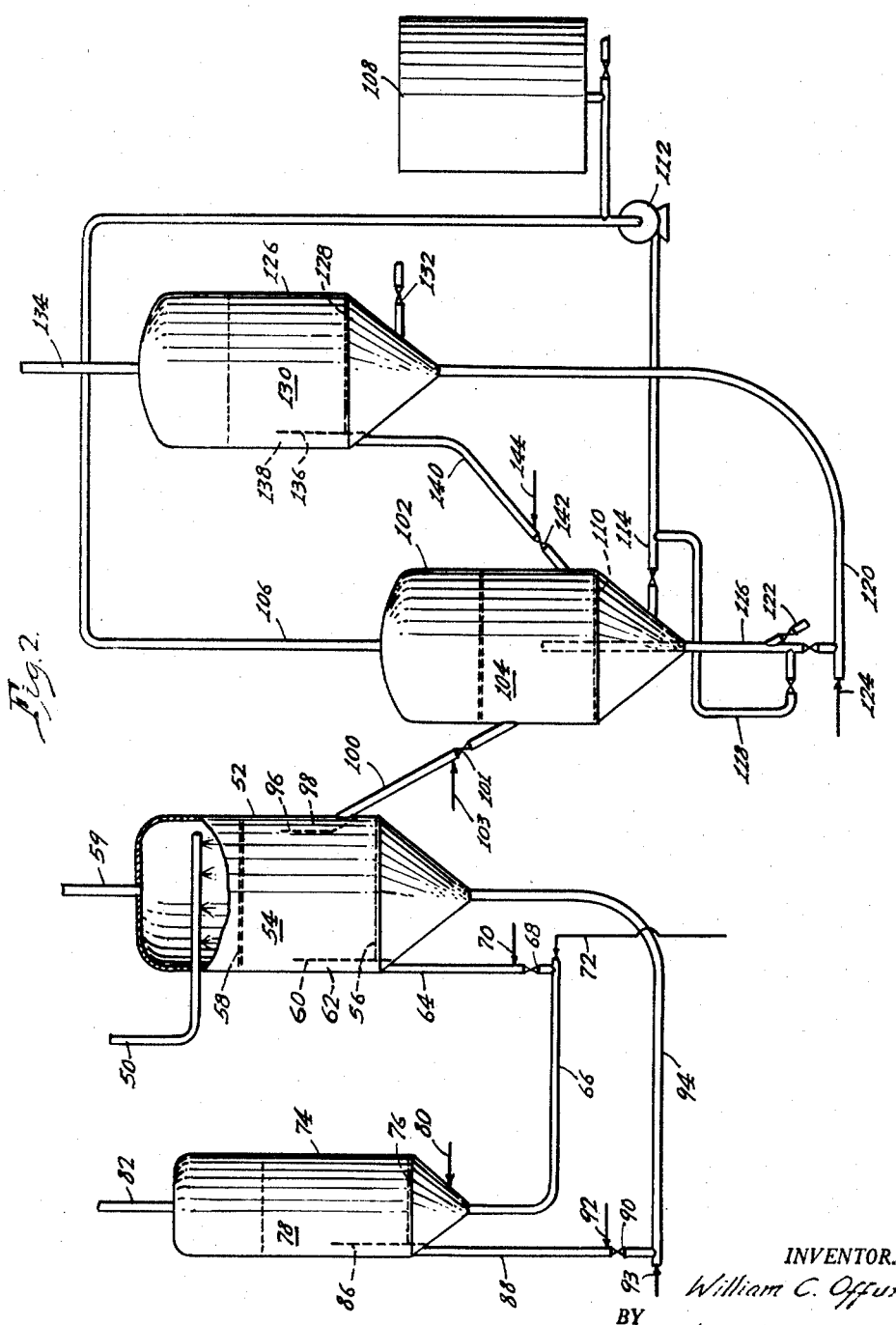

2,910,411

PRODUCTION OF GASES RICH IN HYDROGEN

William C. Offutt, Mount Lebanon, Pa., assignor to Gulf Research & Development Company, Pittsburgh, Pa., a corporation of Delaware Application May 31, 1955, Serial No. 511,830

8 Claims. (Cl. 202—22)

This invention relates to a process for the production of hydrogen and more particularly to the production of gases rich in hydrogen and a high quality calcined coke.

The use of hydrogen in the refining of petroleum oils has been increasing for many years and probably will continue to increase. One important use is in hydrogenation processes for the improvement of distillate oils. The very high demand for ammonia and ammonia products particularly for fertilizers has further increased the demand for hydrogen. In most processes using hydrogen, it is desirable that the hydrogen be available in high concentrations, and the availability of a source of gases rich in hydrogen is often an important factor in determining whether or not a process will be profitable.

Until recently most of the coke produced in refining of petroleum crude oils has been produced in delayed coking processes in which hot, heavy fractions of the crude oil are delivered into a coking drum in which they remain until carbonized to form a green coke. The gases produced by the cracking of the heavy hydrocarbons in the coking drums of delayed coking processes are of relatively low value, being rich in methane and low in hydrogen concentration. These gases are usually of value only as a fuel. If the crude oil contains substantial amounts of sulfur, relatively high concentrations of hydrogen sulfide are obtained in the gases from the delayed coking drum. Although the green coke from the delayed coking process is of relatively low value, it can be calcined to produce a valuable calcined coke having excellent characteristics for the preparation of electrodes.

It has been found that gases rich in hydrogen and an excellent calcined coke can be produced by first coking a carbonaceous material to a green coke at a relatively low temperature in a process in which substantially all of the green coke is heated to approximately the same temperature. The green coke is then calcined in an externally-heated calcining procedure wherein combustion products are kept separate from gases formed during the calcining, and the gases produced during the calcination of the coke are collected separately from the gases produced in the preparation of the green coke. The term "externally-heated" designates those processes in which the heat for the calcination of the green coke is supplied by means other than combustion of the green coke or combustion of other fuels in direct contact with the green coke.

In the drawings:

Figure 1 is a diagrammatic representation of a system for the preparation of calcined coke by this invention in which green coke is heated by hot calcined coke particles and a mixture of the two is passed through a reaction vessel in which the green coke is maintained at an elevated temperature for a period sufficient to complete the calcination.

Figure 2 diagrammatically illustrates a flow sheet for the preparation of a green coke in a fluidized process and the calcination of the green coke in a fluidized bed in a calciner.

Figure 3 is a diagrammatic illustration of an externally heated calciner for the production of gases rich in hydrogen by the process of this invention.

The preferred green coke employed as a charge stock in the process for the preparation of the gases rich in hydrogen and calcined coke by this invention is petroleum coke from a conventional delayed coking process. Apparently, the initial structure of the coke produced by the delayed coking process is retained during the calcining, or at least influences the structure of the calcined coke. Whatever the mechanism of the coke formation which determines the characteristics of the calcined cokes, calcined cokes produced by the calcination of green coke from delayed coking processes are generally superior, as indicated by high density, mechanical strength and electrical conductivity, to calcined cokes produced by calcining green coke from continuous coking processes, even though the final calcination temperature is the same for coke from both sources.

Although this invention is of greatest value in conjunction with delayed coking processes, it can also be used for the production of gases rich in hydrogen by the calcination of green coke from higher temperature coking processes, such as fluidized coking processes. Hence, the carbonaceous material used as a charge stock in the production of the green coke to be calcined by this invention can be any of the carbonaceous materials suitable as charge stocks for delayed coking or fluidized coking operations. Examples of suitable charge stocks are residual oils, tars from recycle cracking processes, asphalts, shale oil, petroleum pitch, tar sands, etc. If the charge stock should be a material having a high metals content, the quality of the calcined coke will be impaired; however, gases rich in hydrogen are obtained.

In a preferred embodiment of this invention a green coke is first produced in a conventional delayed coking process in which a hot residual or tar oil is charged to a coking drum maintained at a temperature of about 775° to 950° F. In the conventional delayed coking processes, the pressure on the coking drums is relatively low, below about 200 pounds per square inch, and in many instances only sufficient to force the gaseous products through subsequent distillation apparatus in which the liquid products are recovered.

Referring to Figure 1, a green coke is prepared by charging a residual oil through, for example, a feed line 2 to a furnace 3 in which it is heated to coking temperatures. The hot oil is discharged from the furnace 3 through a line 4 to a coking drum 5 in which the heavier fractions remain for a period sufficient to complete coking. The lower boiling fractions discharged from the heater are withdrawn from the top of the coking drum 5 through a line 6 and delivered to product recovery apparatus, not shown. When coking drum 5 becomes filled to the desired level with green coke, the drum is taken off-stream and the hydrocarbon stream through line 4 is delivered to another drum. Green coke is removed from the drum and delivered by conveyor 7 and elevator 8 to a storage hopper 9.

The green coke is delivered through an inlet line 10 into the upper end of a calciner 12 in which it is mixed with hot calcined coke particles discharged into the reactor from a transfer line 14. The calciner 12 is an upright cylindrical vessel having an outlet 16 extending from its upper end for the removal of the hydrogen-rich gases produced in the calcination of the coke. Outlet line 16 is connected with suitable apparatus, not shown, for the recovery and storage of the hydrogen-rich gases produced in the calciner 12. Calciner 12 may be provided with suitable baffles for the mixing and remixing of the green coke and the hot calcined coke particles as they move downwardly through the calciner to insure uniform heating of the green coke to the calcining temperature.

Calciner 12 is tapered at its lower end to an outlet line 18 provided with a valve 20 for the discharge of calcined coke from the system. A transfer line 22 opens at its upper end into the outlet line 18 and extends downwardly to a pickup chamber 24. A valve 26 in the transfer line 22 permits control of the rate of withdrawal of the calcined coke particles from line 18.

The pickup chamber 24 is of conventional design for suspending the hot calcined coke particles delivered from transfer line 22 in a transfer gas in which the coke is carried upwardly through a gas lift line 28 to a heater 30. The lift gas can be an inert gas, such as nitrogen or flue gas, or an oxygen-containing gas or mixtures of oxygen-containing gases and inert gases. The lift gas is introduced into the pickup chamber through a lift gas supply line 32. If desired, the gas lift employed for transferring calcined coke particles to the heater 30 can be replaced by the conventional bucket lift used in moving-bed processes.

The calcined coke particles delivered through lift line 28 into the heater 30 are disengaged from the lift gases in the heater 30 and fall downwardly into a moving bed 34 of coke particles in the heater. An oxygen-containing gas is introduced into the lower end of the heater through a supply line 36 and distributor 38. Part of the calcined coke is burned in the heater 30 to supply the heat required to raise the temperature of the green coke to the calcination temperature and to supply the heat required for the conversion taking place during the calcination.

In the operation of this process, the hot coke particles at a temperature in the range of about 1400° to 2400° F. are discharged into the top of the calciner 12 through line 14. The green coke to be calcined is introduced through line 10 into the calciner 12 where it is mixed with the hot coke particles. The hot coke particles supply the heat required to heat the green coke to the desired calcining temperature and maintain the calciner 12 at the desired temperature in the range of 1200° to 2000° F. The admixture of the hot coke and the green coke quickly raises the temperature of the green coke to the desired coking temperature to produce gaseous reaction products of optimum composition. In general, the volume of gases obtained will not be influenced greatly by the rate of heating of the green coke as long as the same maximum temperature is reached; however, gases having higher hydrogen concentrations can be obtained when the green coke is quickly heated to the maximum calcination temperature.

The flow sheet of Figure 2 is for a process for the preparation of the green coke in a fluidized coking operation and the calcination of the green coke in a fluidized bed. Ordinarily, fluidized coking processes are operated at higher temperatures, in the range of 900° F. to 1100° F. to increase the capacity of the process and to reduce agglomeration in the fluidized bed. Because of the higher quality calcined coke that can be produced from green coke produced in low temperature coking processes, it may be preferred to maintain the temperature in the fluidized coking reactor at a low temperature below the usual temperature of fluidized coking, such as, for example, 775° to 950° F. A low temperature in the production of the green coke has the additional advantage of increasing the volume of the gases liberated during calcination.

For purposes of illustration, the flow sheet of Figure 2 will be described for the preparation of coke from residual oil. The residual oil is introduced through a feed line 50 into a reactor 52 containing a fluidized bed 54 of coke. The fluidized bed 54 is maintained above a grid 56 extending across the reactor 52 by the upward flow of coke and transfer gases through the grid. The upper surface of the fluidized bed 54 is indicated by reference numeral 58. Volatile products of the coking reaction are discharged from the reactor 52 through an outlet line 59 at its upper end to suitable product recovery equipment, not shown.

A vertical baffle 60 extends upwardly above the grid 56 into the fluidized bed 54 to define a well 62 through which coke particles are withdrawn. A standpipe 64 opens at its upper end into the lower end of the well and extends downwardly to open at its lower end into a transfer line 66. A valve 68 in the standpipe 64 permits control of the rate of flow of coke particles therethrough. An aeration gas such as steam is introduced into the standpipe through line 70.

The coke particles are carried through transfer line 66 by a transfer gas, for example, an oxygen-containing gas, from a supply line 72, into the lower end of a heater 74. The coke particles pass upwardly through a grid 76 extending across the lower end of the heater 74 into a fluidized bed 78 in the heater. Additional oxygen-containing gas for burning carbon to supply the heat requirements for the coking reaction, if required, is introduced into the heater 74 through a supply line 80. Flue gases from the heater are discharged through an outlet line 82 at its upper end to a suitable stack, not shown.

A vertical baffle 86 extends upwardly above the grid 76 into the fluidized bed 78 to form a well through which coke particles are withdrawn. A standpipe 88 opening at its upper end into the lower end of the well formed by baffle 86 and the wall of the reactor provides means for withdrawing hot coke particles from the fluidized bed 78. The rate of withdrawal of the coke particles is controlled by a valve 90 in the standpipe 88. Aeration of the column of coke particles in standpipe 88 and draw-off line 86 is obtained by the introduction of an aeration gas through a line 92.

The lower end of standpipe 88 is connected to a transfer line 94 which extends upwardly to the lower end of the reactor 52. Coke particles discharged from the standpipe 88 into the transfer line 94 are carried by a suitable transfer medium, for example, steam introduced through a supply line 93, upwardly through transfer line 94 and grid 56 into the fluidized bed 54 in the reactor 52.

A second baffle 96 in the reactor 52 forms a well 98 through which green coke particles are withdrawn from the coking operation for calcining. A transfer line 100 extends from the lower end of the well 98 downwardly and opens at its lower end into a calciner 102, in which a fluidized bed 104 of hot coke at a temperature in the range of 1200° to 2000° F. is maintained. In the apparatus shown, the coke particles are delivered directly in a dense phase through transfer line 100 into the fluidized bed 104. A valve 101 in line 100 allows control of the rate of feed of green coke into the calciner 102. Aeration gas is introduced into line 100 through a supply line 103.

An outlet line 106 extends from the upper end of the calciner 102 to suitable gas collection equipment such as a gas holder 108. Intermediate process equipment such as gas-washing apparatus, distillation apparatus for removal of heavier distillation products, etc., may be employed between the calciner 102 and gas holder 108 but is not illustrated since it is not part of the present invention.

In the calciner illustrated in Figure 2, the fluidized bed 104 is maintained above a grid 110 by suitable ascending fluidizing gases. A preferred fluidizing gas is gas recycled from the outlet line 106 through a compressor 112 and a fluidizing gas supply line 114.

A standpipe 116 extends downwardly from the fluidized bed 104 through the lower end of the calciner 102 to a transfer line 120. Aeration gas, preferably recycled hydrogen-rich gases, is introduced into the lower end of standpipe 116 from a line 118 connected with line 114. A product withdrawal line 122 opens off the standpipe 116 for the removal of calcined coke from the system.

A transfer gas, which can be an oxygen-containing gas, is introduced into transfer line 120 from a supply line 124 to pick up the coke particles and carry them upwardly to a heater 126. The coke particles and transfer gas pass upwardly into a fluidized bed 130 of coke particles in which burning of the coke to supply the heat necessary for the calcination occurs. Additional oxygen-containing gas, as required for the heat balance of the calcination, is introduced into the heater 126 through a supply line 132. Flue gases from the fluidized bed 139 are discharged from the heater 126 through an outlet line 134 connected to a suitable stack, not shown.

Each of the reactor 52, heater 74, calciner 102 and heater 126 is ordinarily provided with a separator to remove entrained solid particles from the gases discharged from the upper surface of the fluidized bed. The separators have been omitted to simplify the drawings.

A baffle 136 extends upwardly into the fluidized bed 130 to form a well 138 which is connected at its lower end with a transfer line 140 for delivery of hot coke particles to the fluidized bed 104 in calciner 102. A valve 142 allows control of the rate of circulation of the hot coke particles from the heater 126 to the calciner 102. Aeration of coke particles in transfer line 140 is accomplished by a transfer gas from line 144.

In the process of the flow sheet illustrated in Figure 2, green coke is produced in the fluidized bed 54 in reactor 52 and delivered through transfer line 100 to calciner 102. The gases produced in the fluidized coking process are discharged from the reactor 52 through line 59 with higher boiling point products. The fluidized bed 104 in the calciner 102 is maintained at a high temperature in the range of 1200° to 2000° F. by the circulation of hot coke particles at 1400° to 2400° F. from the heater 126 at the rate and temperature required to maintain the desired temperature in the calciner 102.

A gas rich in hydrogen is discharged from the calciner 102 and collected entirely separately from the lower-value gases liberated during the production of the green coke. Moreover, there is no opportunity for the gases produced in the calcination of the green coke to be diluted with combustion gases or to come into contact at high temperatures with oxygen-containing gases with the consequent combustion of the hydrogen.

The external heating of the coke of produce a calcined coke can also take place in a jacketed heater in which heat is transferred through the walls of the calcining chamber. An example of apparatus suitable for calcining a green coke and collecting the gases liberated during the calcination separately from the gases liberated during the preparation of the green coke is illustrated in Figure 3. The calciner, indicated generally by reference numeral 150, consists of an elongated vertical chamber 152 enclosed over the major part of its length by a jacket 154. Chamber 152 can be constructed of an alloy steel, capable of withstanding the high temperatures, or of a refractory material such as fire brick. An inlet line 156 for introducing green coke into the tube 152 extends into the upper end of the tube to a level below a take-off line 158 for the gases liberated during the calcination. Calcined coke is discharged from the bottom of the tube 152 through an outlet line 160 provided with a valve 162. The jacket 154 is provided with an inlet 164 at its lower end for heating medium and an outlet 166 for the heating medium at its upper end. The heating medium may be any suitable fluid such as superheated steam or, preferably, hot combustion gases.

Green coke, preferably from a delayed coking operation, is introduced into the upper end of the calciner through inlet 156, passes downwardly through chamber 152, and is discharged through outlet 160. The green coke is heated to a temperature in the range of 1200° to 2000° F. as it moves downwardly through the tube 152. The gases produced during the calcination are discharged through line 158 and a line 164 for delivery to a suitable gas holder. The calciner 150 can be operated either continuously or in a batch process.

The following examples illustrate the production of gases rich in hydrogen by the coke calcining process of this invention.

*Example I*

A reduced Kuwait crude oil having an API gravity of 9.7° and constituting the bottom 18 percent of the crude oil was heated in a preheater to a temperature of 860° F. The hot reduced crude oil was discharged into a coking drum maintained at a temperature of 854° F. and a pressure of 11.3 pounds per square inch gauge to produce a green coke. The gases liberated from the coking drum during the coking operation had the following composition.

Percent $C_{2+}$ ---------------------------------- 49.6
Percent $H_2$ ------------------------------------ 4.8
Percent $CH_4$ ----------------------------------- 36.6
Percent $H_2S$ ----------------------------------- 9.0

*Example II*

A sample of the green coke from Example I was placed in a tubular batch heater and the temperature raised at the rate of 7° C. per minute. Samples of the gas were collected at the end of the specified volume intervals shown in the following table during the heating until no more gas was evolved. The gases liberated had the following composition. The volume of gas obtained was equivalent to approximately 10,600 standard cubic feet per ton of calcined coke.

| Samples | 1 | 2 | 3 | 4 | Overall |
|---|---|---|---|---|---|
| Temperature, °F | 1,257 | 1,548 | 1,724 | 2,004 | ------ |
| volume, liters, of gas | 1.0 | 2.0 | 1.0 | 1.0 | 5.0 |
| Percent $H_2$ | 44.1 | 90.7 | 95.2 | 93.9 | 73.9 |
| Percent $CH_4$ | 50.2 | 6.0 | 2.3 | 0.6 | 20.4 |
| Percent $H_2S$ | 4.2 | 2.5 | 1.9 | 2.5 | 0.9 |

*Example III*

A sample of the green coke from Example I was heated in a series of steps to a maximum temperature of 1050° C. The coke was held at each temperature in the stepwise heating until no more gas was evolved. Samples of the gas obtained at the end of each temperature interval were analyzed and the volume of the gas liberated was measured. 7500 cubic feet of hydrogen were liberated per ton of coke. The results of the calcination were as follows:

| Samples | 1 | 2 | 3 | 4 | Overall |
|---|---|---|---|---|---|
| Temperature, °F | 1,112 | 1,292 | 1,472 | 1,922 | ------ |
| volume, liters, of gas | 1.1 | 1.0 | 1.1 | 1.9 | 5.1 |
| Percent $H_2$ | 35.1 | 68.3 | 86.1 | 95.0 | 70.8 |
| Percent $CH_4$ | 58.4 | 24.5 | 9.2 | 0.8 | 20.7 |
| Percent $H_2S$ | 4.5 | 5.3 | 3.5 | 2.7 | 0.8 |

*Example IV*

A sample of the green coke from Example I was heated very rapidly to a temperature of 1832° F. by inserting a tube containing the green coke into a furnace maintained at that temperature. All of the gas liberated during calcination was collected as a single sample which had the following composition. 8470 cubic feet of hydrogen were liberated per ton of coke. The results of the calcination were:

Temperature, °F. ---------------------------------- 1832
Volume, liters, of gas ---------------------------- 5.0
Percent $H_2$ ------------------------------------- 80.0
Percent $CH_4$ ----------------------------------- 16.5
Percent $H_2S$ ----------------------------------- 0.7

The two stage coking process of this invention allows the preparation of calcined coke of high quality with the formation of gases rich in hydrogen. By conducting the calcination in a step entirely separate from the preparation of the green coke, isolation of the gases rich in hydrogen produced during the calcination from the gases of low value produced during the formation of the green coke is possible. Moreover, the external heating of the green coke to produce the calcined coke avoids the dilution of the hydrogen-rich gases with combustion products and burning of the hydrogen as a result of mixing with oxygen-containing gases at high temperatures.

The size of the green coke particles charged to the calciner will vary widely and will depend on the type of calciner employed. For example, if calcination is accomplished in a fluidized bed, the size of the coke particles will generally be of the order of 50 to 500 microns in diameter. If the calcination is accomplished in a moving bed calciner of the type illustrated in Figure 1, the size of the particles can be somewhat larger such as pellets one-sixteenth to about one inch in diameter. Still larger green coke particles can be charged to and calcined in indirectly heated rotary kilns.

The term "green coke" as used in this specification designates a coke in which carbonization is sufficiently complete to fix the structure of the coke but which still contains substantial quantities of hydrocarbons which are cracked on heating to calcination temperatures. In general, the term "green coke" is used to designate a coke which has been produced in a coking operation at a temperature which does not exceed about 950° F. and which has a volatile matter content ranging from about 3 to 15 percent.

I claim:

1. A process for the preparation of gases having a concentration, above about 70%, of hydrogen consisting essentially of preparing a green petroleum coke, externally heating the green coke in the absence of uncoked carbonaceous material and gaseous products of combustion to a temperature in the range of about 1200° to 2000° F., maintaining the coke at 1200° to 2000° F. for a period to complete the calcination, and collecting the gases having the desired high concentration of hydrogen liberated during the heating and calcination separately from the gases liberated during the preparation of the green coke.

2. A process for the preparation of gases having a high concentration, above about 70%, of hydrogen comprising preparing a green petroleum coke at a temperature below about 950° F., introducing the green coke without intermediate treating with an oxygen-containing gas into a calciner, calcining the green coke by externally heating the thus formed coke in the absence of uncoked carbonaceous material and products of combustion to a temperature in the range of 1200° to 2000° F., maintaining the coke at 1200° to 2000° F. to complete the calcination and collecting the gases liberated during the calcination separately from the gases liberated during the calcination of the green coke, said gases liberated during the calcination having a hydrogen concentration of at least about 70%.

3. A process for the preparation of gases having a high concentration, above about 70%, of hydrogen comprising introducing an untreated green petroleum coke from a delayed coker operated at a temperature below about 950° F. into a calciner, externally heating the thus formed green coke in the absence of uncoked carbonaceous material and products of combustion to a temperature above about 1200° F., maintaining the coke at the temperature in excess of 1200° F. for a period to calcine the coke, and collecting the gases of high hydrogen content liberated during the calcination separately from the gases liberated during the preparation of the green coke.

4. A process for the preparation of gases having a concentration above about 70% of hydrogen comprising preparing a green petroleum coke in a delayed coker operated at a temperature below about 950° F., delivering the green coke into a calciner containing a bed of petroleum coke particles at a temperature above about 1200° F., withdrawing a stream of coke particles from the bed and transferring them to a heater containing a bed of coke particles, passing an oxygen-containing gas upwardly through the bed of coke particles in the heater to burn a portion of the coke, and raise the temperature of the coke to a temperature of about 1400° to 2400° F., delivering a stream of coke particles from the heater to the calciner for admixture with the green coke particles to heat the green coke to the calcination temperature, withdrawing a stream of calcined coke particles from the calciner, and collecting the gases liberated in the calciner as a separate stream of gases having a concentration of hydrogen above about 70%.

5. A process as set forth in claim 4 in which the beds of coke particles in the calciner and heater are fluidized beds of coke particles.

6. A process as set forth in claim 4 in which the beds of coke particles in the calciner and heater are moving beds of coke particles.

7. A process for the preparation of a gaseous stream having a high concentration, above about 70%, of hydrogen comprising preparing a green petroleum coke in a fluidized coking process having a reactor and a heater, withdrawing a stream of fluidized coke particles from the reactor of the fluidized coking apparatus and delivering them into a calciner, externally heating the coke particles in the calciner in the substantial absence of uncoked carbonaceous material and contact with products of combustion to a temperature of about 1200° to 2000° F., maintaining the coke at a temperature of 1200° to 2000° F. to complete the calcination, collecting the gases liberated during the calcination as a separate stream of gases having a concentration of hydrogen above about 70%, and withdrawing a stream of coke particles from the calciner.

8. A process for the production of gases having a high concentration, above about 70%, of hydrogen comprising preparing a green petroleum coke in a fluidized coking system in which a carbonaceous material is introduced into a fluidized reactor for contact with hot coke particles circulated to the reactor from a coke heater, withdrawing a stream of green coke from the reactor of the fluidized coking apparatus and delivering it to a fluidized bed consisting essentially of coke particles in a calciner maintained at a temperature of about 1200° to 2000° F., withdrawing a stream of coke particles from the calciner and delivering them into a heater, passing an oxygen-containing gas in contact with the coke particles in the heater to burn a portion of the coke and heat the particles to a temperature above about 1400° F., returning a stream of coke particles from the heater to the calciner to supply heat for the calcination of the green coke, collecting the gases liberated in the calciner as a separate stream of gases having a high concentration of hydrogen, and recycling a portion of the gases liberated in the calciner through the calciner to fluidize the solid particles of coke therein.

References Cited in the file of this patent

UNITED STATES PATENTS

| 815,453 | Merrill | Mar. 20, 1906 |
|---|---|---|
| 1,519,784 | Lomax et al. | Dec. 16, 1924 |
| 1,754,765 | Parr et al. | Apr. 15, 1930 |
| 2,445,328 | Keith | July 20, 1948 |
| 2,600,430 | Riblett | June 17, 1952 |
| 2,743,218 | Herrmann | Apr. 24, 1956 |